UNITED STATES PATENT OFFICE

HEINRICH ULRICH AND KARL SAUERWEIN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

SULPHURIC ESTER OF GLYCOL ETHERS

No Drawing. Application filed May 2, 1931, Serial No. 534,690, and in Germany May 7, 1930.

The present invention relates to the production of assistants for the textile and related industries.

We have found that valuable assistants for the textile and related industries, and especially wetting agents for mercerization, can be obtained by sulphonating hydroxyl-bearing ethers of glycols with aliphatic, i. e. open chain aliphatic or cycloaliphatic, mono- or polyhydric alcohols, preferably with hydroxyl-bearing ethers containing from 4 to 8 carbon atoms. The reaction is carried out in the usual manner for such sulphonation, as for example by mixing the said ethers with sulphonating agents, such as sulphuric monohydrate, chlorsulphonic acid, oleum or sulphur trioxide, if desired while slightly warming up to say 100° C. and avoiding decomposition by too high temperatures and, if desired, in the presence of inert organic diluents, as for example trichlorethylene, carbon tetrachloride, chloroform, ethyl ether or nitrobenzene.

The said ethers may be prepared in any known and convenient manner. A particularly suitable method is the conversion of aliphatic mono- or polyhydric alcohols with alkylene oxides, such as ethylene, propylene, 1.2-, 2.3- or 1.3- butylene oxides and the like. The alcohols etherified with the glycols may be chosen from any aliphatic monohydric alcohols, containing preferably up to 4 carbon atoms, such as ethyl, n-propyl, iso-propyl, n-butyl or iso-butyl alcohols, or also from hexyl, ethyl-hexyl, cetyl, lauryl or stearly alcohols, or from aliphatic polhydric alcohols, such as glycols or glycerols, or from cycloaliphatic alcohols, such as cyclohexanol or its homologues.

The products prepared in the said manner and their water-soluble salts with alkalies, for example with sodium, potassium, ammonia or amines especially alkylol amines, such as mono-, di- or tri-ethanol amines have an excellent wetting, cleansing, dispersing and washing power and are therefore suitable as additions to baths for a great variety of purposes in the textile industry, as for example for dyeing, bleaching, dressing and washing. The acid esters and their salts of ethers containing from 4 to 8 carbon atoms are particularly valuable for increasing the wetting power of mercerizing liquors for which purpose the ester or their salts are usually employed in quantities of from 0.5 to 1 per cent of the liquors, the effect being increased by adding difficultly water-soluble organic solvents, such as di-butyl ether, butanol or similar alcohols or ethers. They are also suitable for the preparation of emulsions, as dispersing agents and the like for the lacquer, leather, paper and like industries.

The following examples will further illustrate the nature of this invention but the invention is not restricted to these examples. The parts are by weight.

Example 1

900 parts of ethylene glycol mono-ethyl ether are mixed at from 5 to 15° C. with 1150 parts of chlorsulphonic acid, hydrochloric acid formed being removed simultaneously or subsequently by passing through an inert gas, such as air, corresponding to the formula $C_2H_5-O-CH_2-CH_2-O-SO_3H$ nitrogen or carbon dioxide. The resulting sulphuric ester may be employed as such or in the form of its water-soluble salts. The sulphuric ester is soluble, for example, in alkaline liquors, such as caustic soda solutions of from 32 to 40° Bé. strength as are employed in mercerizing, and imparts a good wetting power to the said liquors.

Example 2

104 parts of ethylene glycol mono-isopropyl ether are slowly mixed with 116 parts of chlorsulphonic acid, the hydrochloric acid formed being removed by passing through a current of air. By neutralizing with the aid of aqueous caustic soda solution the acid sulphuric ester of ethylene glycol mono-isopropyl ether corresponding to the formula $(CH_3)_2=CH-O-CH_2-CH_2-O-SO_3H$ is converted into its sodium salt which may find useful application as a wetting agent for addition to mercerizing liquors.

Instead of the aforesaid glycol ether, 136 parts of glycerine mono-hydroxy-ethyl ether or 100 parts of di-ethylene glycol may be employed.

*Example 3*

1180 parts of ethylene glycol mono-n-butyl ether are incorporated at from 5 to 15° C. with 1100 parts of chlorsulphonic acid, hydrochloric acid formed being removed by passing through a current of an inert gas, such as air, nitrogen or carbon dioxide. The acid sulphuric ester of the butyl ether which corresponds to the formula $CH_3-CH_2-CH_2-CH_2-O-CH_2-CH_2-O-SO_3H$ is easily soluble in alkaline liquors of a high concentration, such as in mercerizing liquors, and imparts thereto a good wetting power. For this purpose the sulphuric ester may be employed as such or in the form of its water-soluble salts, as for example the salts with alkali metals or amines.

*Example 4*

804 parts of the mono-ethyl ether of di-ethylene glycol ($C_2H_5-O-C_2H_4-O-CH_2-CH_2OH$) are slowly incorporated at from 5 to 15° C. with 690 parts of chlorsulphonic acid, the hydrochloric acid formed being removed either simultaneously or subsequently by passing through a current of air. The sulphuric ester of the glycol ether which corresponds to the formula $C_2H_5-O-C_2H_4-O-CH_2-CH_2-O-SO_3H$ is rendered neutral with the aid of aqueous caustic soda solution.

Instead of the said ether 910 parts of the ether from equimolecular proportions of glycerol mono-isopropyl ether may be employed, the resulting sulphuric ester which presumably corresponds to the formula $(CH_3)_2=CH-O-CH_2-CH(OH)-CH_2-O-SO_3H$ being equally useful as an addition to mercerizing liquors.

*Example 5*

240 parts of chlorsulphonic acid are slowly introduced into 240 parts of the mono-methyl ether of di-ethylene glycol while stirring at about 20° C., the reaction mixture being then stirred until the product is completely soluble in water. The reaction mixture is then poured onto 400 parts of ice and then rendered neutral with caustic soda. The sodium salt of the acid sulphuric ester obtained which corresponds to the formula $CH_3-O-CH_2-CH_2-O-CH_2-CH_2-O-SO_3Na$ imparts a good wetting power to mercerizing liquors.

*Example 6*

230 parts of the hydroxy-ethyl ether obtainable from lauryl alcohol and ethylene oxide are slowly introduced into 150 parts of sulphuric acid monohydrate, the temperature being kept at about 30° C. Ice is added to the sulphonation product and the latter freed from remainders of free sulphuric acid by means of an aqueous concentrated common salt solution. The sodium salt which corresponds to the formula $C_{12}H_{25}-O-CH_2-CH_2-O-SO_3Na$ may be obtained by neutralizing with caustic soda solution while cooling.

Instead of monohydrate, other sulphonating agents, such as chlorsulphonic acid, oleum and the like may be employed. Similarly the sulphonation may be carried out in inert diluents, as for example in trichlorethylene or carbon tetrachloride. Similar products are obtained by employing ethers of glycols with cetyl alcohol, stearyl alcohol or ethylhexyl alcohol instead of the ether from lauryl alcohol and ethylene oxide, the method of preparation of the ethers being immaterial.

What we claim is:

1. The process for the production of assistants for the textile and related industries, which comprises acting with a sulphonating agent on an ether of a glycol with an aliphatic alcohol.

2. The process for the production of assistants for the textile and related industries, which comprises acting with a sulphonating agent on an ether of a glycol with an aliphatic alcohol which ether contains at least one free hydroxyl group and from 4 to 8 carbon atoms.

3. As new articles of manufacture and assistants for the textile and related industries, sulphonation products of ethers of glycols with aliphatic alcohols.

4. As new articles of manufacture and assistants for the textile and related industries, sulphonation products of ethers of glycols with aliphatic alcohols which ethers contain from 4 to 8 carbon atoms.

5. As new articles of manufacture and assistants for the textile and related industries, sulphuric esters of ethers of glycols with aliphatic alcohols which ethers contain from 4 to 8 carbon atoms.

6. As new articles of manufacture and assistants for the textile and related industries, sulphuric esters of ethers of glycols with aliphatic polyhydric alcohols which ethers contain from 4 to 8 carbon atoms.

7. As new articles of manufacture and assistants for the textile and related industries, sulphuric esters of ethers of glycols with aliphatic monohydric alcohols which ethers contain from 4 to 8 carbon atoms.

8. As new articles of manufacture and assistants for the textile and related industries, sulphuric esters of ethers of ethylene glycol with aliphatic monohydric alcohol containing from 3 to 4 carbon atoms.

9. As a new article of manufacture and assistant for the textile and related industries, the sulphuric ester of ethylene glycol mono-butyl ether.

10. As new articles of manufacture and assistants for the textile and related industries, water-soluble neutralized sulphuric esters of ethers of glycols with aliphatic alcohols which ethers contain from 4 to 8 carbon atoms.

In testimony whereof we have hereunto set our hands.

HEINRICH ULRICH.
KARL SAURWEIN.